US012807876B2

(12) United States Patent
Jones et al.

(10) Patent No.: US 12,807,876 B2
(45) Date of Patent: *Nov. 24, 2026

(54) EFFICIENT REMOVAL AND STORAGE OF CARBON DIOXIDE

(71) Applicant: Carba Inc., Edina, MN (US)

(72) Inventors: Andrew Jones, Edina, MN (US); Robert Crane, Edina, MN (US)

(73) Assignee: Carba Inc., Eden Prairie, MN (US)

( * ) Notice: Subject to any disclaimer, the term of this patent is extended or adjusted under 35 U.S.C. 154(b) by 499 days.

This patent is subject to a terminal disclaimer.

(21) Appl. No.: 18/468,324

(22) Filed: Sep. 15, 2023

(65) Prior Publication Data

US 2024/0093094 A1 Mar. 21, 2024

Related U.S. Application Data

(60) Provisional application No. 63/408,245, filed on Sep. 20, 2022, provisional application No. 63/407,194, filed on Sep. 16, 2022, provisional application No. 63/407,215, filed on Sep. 16, 2022.

(51) Int. Cl.

*C10B 53/02* (2006.01)
*C01B 32/05* (2017.01)
*C10B 47/28* (2006.01)

(52) U.S. Cl.

CPC .............. *C10B 53/02* (2013.01); *C01B 32/05* (2017.08); *C10B 47/28* (2013.01)

(58) Field of Classification Search

CPC .......... C01B 32/05; C10B 53/02; C10B 47/28
See application file for complete search history.

(56) References Cited

U.S. PATENT DOCUMENTS

| | | | | |
|---|---|---|---|---|
| 3,132,459 | A * | 5/1964 | Grillot | A01F 15/101 100/188 R |
| 5,216,821 | A * | 6/1993 | McCabe | C02F 11/004 34/426 |
| 2011/0213188 | A1 | 9/2011 | Agblevor et al. | |
| 2012/0181160 | A1 | 7/2012 | Cheiky | |
| 2015/0143787 | A1* | 5/2015 | Dietrich | A01D 43/06 56/153 |
| 2020/0354911 | A1* | 11/2020 | Wu | E02B 11/02 |
| 2020/0369964 | A1* | 11/2020 | Tenore | C10B 53/07 |
| 2021/0356450 | A1 | 11/2021 | Siciliano et al. | |
| 2022/0048831 | A1* | 2/2022 | Wilson | C05F 11/00 |
| 2022/0082506 | A1* | 3/2022 | Moore | G01V 8/20 |

FOREIGN PATENT DOCUMENTS

| | | | |
|---|---|---|---|
| CN | 105684590 | A | 6/2016 |
| CN | 108854951 | B | 4/2021 |
| GB | 2615165 | A | 8/2023 |
| JP | 2001-009432 | A | 1/2001 |
| WO | 2004/031324 | A1 | 4/2004 |
| WO | 2024/059874 | A1 | 3/2024 |
| WO | 2024/059876 | A1 | 3/2024 |

OTHER PUBLICATIONS

International Search Report and Written Opinion issued in corresponding International Patent Application No. PCT/US2023/074501, Mar. 14, 2024.

Jimmy K. Soeherman, Andrew J. Jones, and Paul J. Dauenhauer; Overcoming the Entropy Penalty of Direct Air Capture for Efficient Gigatonne Removal of Carbon Dioxide; ACS Eng. Au 2023,3,114-127.

Extended European Search Report issued in corresponding European Patent Application No. 23866585.5, Aug. 17, 2026.

Dufour Anthony: "Geological Sequestration of Biomass Char to Mitigate Climate Change", Environmental Science & Technology, [Online] vol. 47, No. 18, Aug. 29, 2013, pp. 10106-10107.

Button Erik S et al: "Deep-C storage: Biological, chemical and physical strategies to enhance carbon stocks in agricultural subsoils", Soil Biology and Biochemistry, Pergamon, Oxford, GB, vol. 170, May 17, 2022.

Bruun E. W. et al: "Biochar amendment to coarse sandy subsoil improves root growth and increases water retention", Soil Use and Management, vol. 30, No. 1, Feb. 7, 2014, pp. 109-118.

* cited by examiner

*Primary Examiner* — Stuart L Hendrickson

(74) *Attorney, Agent, or Firm* — Merchant & Gould PC

(57) ABSTRACT

A process is hereby provided for permanently (>1000 years) reducing carbon dioxide in the atmosphere. The process involves the cultivation of tree and plant waste (biomass), the conversion of the biomass in a reactor to a carbon product, e.g., charcoal, and subsequent storage of the carbon product. The reactor used for conversion is run at a low temperature, e.g., 300-450° C. Thus, there is negligible cracking. The product is primarily a solid carbon product, which is safe and can be easily handled. The carbon product can also be safely stored. In one embodiment, the carbon product is buried in a location that is tested for limited oxygen at burial depths. The permanence of the $CO_2$ reduction is therefore assured.

16 Claims, 9 Drawing Sheets

EFFICIENT REMOVAL AND STORAGE OF CARBON DIOXIDE

CROSS-REFERENCE TO RELATED APPLICATIONS

This application claims priority to U.S. Provisional Application Ser. No. 63/407,194 filed Sep. 16, 2022, U.S. Provisional Application Ser. No. 63/407,215, filed Sep. 16, 2022, and U.S. Provisional Application Ser. No. 63/408,245, filed Sep. 20, 2022, the complete disclosures of which are incorporated herein by reference in their entireties.

FIELD

The present application relates to the reduction of carbon dioxide in the atmosphere. The present process provides a more permanent solution.

BACKGROUND

The continued emissions of gasses into Earth's atmosphere has emerged as an existential crisis in the 21st century. Over a century of combustion of fossil fuels has accumulated excess carbon dioxide raising the composition to 414 ppm in 2021, far above the ~300 ppm $CO_2$ composition at the beginning of the 20th century. At the current rate of carbon accumulation in the atmosphere, carbon dioxide concentrations in the atmosphere could produce a 5° C. warming by the end of the century, excluding any mitigation. The resulting climate change has been predicted for a century, with increasing sea levels, more powerful storms, and more intense and frequent droughts and heat waves. Catastrophe is predicted for wildlife, the environment, and human civilization, with increased extinction of species, human migration away from climate-impacted areas, and substantial economic costs imposed by these global changes.

Climate change will have sweeping effects on human society including the economy and financial sector. Climate-related shifts in the physical environment can slow economic growth and increase the likelihood of disruption and reductions in output, employment, and business profitability. Humans and animals will face new survival challenges because of climate change. Storms, heat waves, more frequent and intensive droughts, melting glaciers, rising sea levels and warming oceans can directly harm animals, destroy places they live, and wreak havoc on people's livelihoods and communities. Carbon dioxide in the atmosphere has a major impact in creating such climate change.

Strategies to address climate change have included new policies to limit carbon emissions, changes in human behavior to low-carbon activities, and new technologies to adjust the relationship of civilization with carbon waste emissions. Electricity generated from wind turbines and solar photovoltaics provide lower-carbon alternatives to conventional steam-generator systems powered by fossil fuel combustion. For power utilization, hydrogen- or battery-powered vehicles can operate from electrical power sources without direct $CO_2$ emissions, while heat pumps, automation, and high-efficiency lighting reduce the environmental impact of buildings. While these technologies provide solutions to mitigate future carbon emissions, the urgent threat of the climate change problem also requires addressing historical $CO_2$ accumulation in the atmosphere via carbon removal.

Removing over a century of carbon emissions from the atmosphere is challenged by the scale of carbon mass that must be reclaimed. This challenge is exacerbated with the ongoing increase in emissions, with global $CO_2$ emissions of 33 Gt-$CO_2$ in 2020 alone (~9 gigatonnes carbon). Human civilization has already emitted several hundred petagrams (100 pgC is $100 \cdot 10^{15}$ gC or 100 gigatonnes) of carbon since the 19th century, with forecasted cumulative emissions of an exagram ($1000 \cdot 10^{15}$ gC, 1000 gigatonnes) of carbon by 2050. For perspective, a gigatonne of graphite (density 2260 kg $m^3$) would fill about 180,000 Olympic swimming pools (almost half of a cubic kilometer). For the total amount of carbon anticipated by 2050 at the current rate of emission, about a thousand gigatonnes, the volumetric space approximately the equivalent of Lake Erie (483 $km^3$) is required to store carbon in the form of dense graphite. Achieving this volume of $CO_2$ collection, processing, and storage in less than half a century will require extraordinary effort using technology that can be rapidly implemented at low cost and a massive scale.

Carbon management technologies must be able to capture carbon dioxide from the atmosphere and store it with a level of permanence relevant to: (i) the time scale of climate change, (ii) the quantity of carbon to be removed, and (iii) the economics per tonne of captured carbon. These processes remain in development but can be classified by their general approach to obtaining carbon, the chemical steps for converting it to some final form, and the type of carbonaceous product and associated degree of permanence. The complexity of the carbon accumulation and storage technologies has led to an expansive array of process concepts, and an even more complex combination of words and phrases to classify the process classes.

One common process method is "direct air capture" (DAC), whereby carbon dioxide is removed from the air via a human-manufactured accumulation process. Carbon dioxide exists within the atmosphere at several hundred parts per million, and the first step requires the collection of carbon dioxide molecules together. Carbon dioxide is dispersed among thousands of oxygen and nitrogen molecules, extending up miles into the atmosphere. This carbon dioxide can be accumulated on surfaces in a process called 'adsorption', with engineered surfaces designed for selective chemisorption and subsequent desorption. Alternatively, carbon dioxide can be accumulated in liquids or solids by 'absorption', after which the resulting enriched solid or liquid is stored, or the $CO_2$ is recovered. In a third option, $CO_2$ is directly separated from air by methods such as membranes. All of these classes of $CO_2$ capture require substantial energy to trap, accumulate, and release enriched $CO_2$ from the atmosphere; this 'entropy penalty' constitutes substantial operating and capital costs associated with the $CO_2$-accumulating equipment.

The existing methods of removing $CO_2$ from the atmosphere have the commonality of accumulating or concentrating gases from the atmosphere. At ~400 ppm $CO_2$ concentration in the atmosphere, the theoretical energy requirement to accumulate to a highly concentrated stream of 99 mol % $CO_2$ is about 20 kJ mole-$CO_2^{-1}$. But real DAC technologies are inefficient, with a realistic 5% efficiency $CO_2$ capturing technology requiring ~400 kJ mole-$CO_2^{-1}$. This energy requirement is equal to ~2500 kWhr Tonne-$CO_2^{-}$, or the equivalent energy generated by a large 3 MW wind turbine operating for one hour. Using more conventional power sources, this exceeds the 158 kJ of electrical energy generated per mole of $CO_2$ produced by coal generation or is close to parity with natural gas fired electricity generation of 396 kJ mole-$CO_2^{-}$. All of these comparisons indicate that a substantial amount of energy is required to drive DAC technologies, and that renewable energy would have a larger impact on $CO_2$ reduction when used to replace coal power plants rather than power DAC.

The individual direct-air capture technologies exhibit power requirements comparable to the theoretical requirement adjusted for 5% efficiency. The use of sorbents for direct air capture has been estimated as high as 12 GJ Tonne-$CO_2^{-1}$ equivalent, corresponding to ~3300 kWhr Tonne-$CO_2^{-}$. By this method, air blown over high surface area materials has $CO_2$ removed by adsorption to the surface; in a second phase, the high surface area materials undergo new conditions such as higher temperature to promote desorption as a high concentration $CO_2$ effluent stream. These methods include additional processing costs such as regeneration of the binding site, compression or purification of the effluent $CO_2$-rich stream, and/or pre-treating of the air input stream such as compression to enhance the rate or extent of adsorption. The conditions of operation of adsorption systems are dictated by the material adsorbents, with engineered binding sites consisting of many structures including Lewis acids incorporated into high surface area materials such as resins, zeolites, carbons, or metal organic frameworks. These newer materials combined with improved process designs can lower the energy requirements to ~1600 kWhr Tonne-$CO_2^{-1}$ (FIG. 2-(*b*)), albeit with lower concentrations of $CO_2$ in the effluent stream (70-80%) that lead to higher compression and injection costs, and higher material costs.

Alternatively, direct air capture has assessed absorption technologies that accumulate carbon dioxide in a liquid, solid, or multi-phase fluid system; this approach also requires substantial energy input consistent with low overall efficiency. Similar to adsorption technologies, absorption methods expose liquids or solids to air leading to uptake and concentration of carbon dioxide, after which the solid or liquid sorbent is moved to a new vessel with conditions promoting the release and concentration of $CO_2$. Sorption processes are designed with respect to the characteristics of $CO_2$ in the sorbent material, with engineered fluids achieving improved control of carbon dioxide capture and release. For example, a continuous process utilizing an aqueous KOH sorbent captures and concentrates $CO_2$ with an energy input of ~2440 kWhr Tonne-$CO_2^{-1}$. Similarly, an amine-based continuous process was modeled to consume ~2990 kWhr Tonne-$CO_2^{-1}$, despite several decades in the development of amine scrubbing technology.

As a third option, carbon dioxide separation via membranes aims to concentrate carbon dioxide in the air to a $CO_2$-rich permeate stream. These membranes are designed for $CO_2$ solubility, often containing amines, with a selectivity target of $CO_2/N_2$ of ~100-200. These processes require substantial unit operation integration, providing compressed gases in systems that are sometimes multiple stages. In one example, commercial membranes separating $CO_2$ from air use as much energy as 18,000 kWhr Tonne-$CO_2^{-1}$. Alternatively, DAC processes using a more advanced membrane can achieve comparable $CO_2$ separation with much less energy (~3,000 kWhr Tonne-$CO_2^{-}$). Despite these improvements, $CO_2$ capture from air using membranes remains an energy-intensive methodology with several challenges.

Membranes, adsorbents, and absorbents all require substantial energy input to acquire, separate, and concentrate $CO_2$ from the air. Moreover, this energy input only advances the carbon capture sequence to a concentrated stream of $CO_2$; energy contributions to convert or place this gaseous carbon in a permanent location remain substantial. One commonly proposed end-point of $CO_2$ is compression and injection into existing geological storage sites. Alternatively, carbon dioxide can be reacted to a variety of products including formation of carbonates with calcium oxides, reduction to methanol for chemical and polymer applications, or in direct use applications such as foods or enhanced oil recovery. In all cases, an energy penalty of several hundred kilojoules must be provided to convert each mole of $CO_2$. Independent of the final $CO_2$ conversion process, all of the DAC methods are significantly limited energetically and economically by the upfront entropy penalty of accumulating and concentrating carbon dioxide.

Individuals and companies can work to reduce their carbon emissions; however, permanent removal of carbon dioxide from the atmosphere is the only way to limit the worst effects of climate change and get back to pre-industrial $CO_2$ levels. A solution for such removal of $CO_2$ is needed to aid in reducing the sweeping shifts of climate change.

SUMMARY

Provided is a process for preparing torrefied carbon while bypassing the entropy penalty of $CO_2$ removal from atmospheric concentrations. The energy and cost associated with accumulation of $CO_2$ from low concentration air is a thermodynamic penalty that cannot be eliminated, but it can be bypassed by utilizing alternative process methods.

Instead of using mechano-chemical equipment to concentrate and react $CO_2$ from air, the present starting point for a carbon storage technology can be biomass of plant materials including trees, grasses, urban yard waste, agricultural residues, food waste, and many more reduced carbon sources. These carbonaceous resources can be obtained distributed throughout urban and rural locations at negative and positive prices, depending on the quality of the material, providing gigatonnes of reduced carbon for sequestration.

A process is hereby provided for permanently (>1000 years) removing carbon dioxide from the atmosphere. The process involves the cultivation of tree and plant waste (biomass), the conversion of the biomass in a reactor to a carbon product, e.g., charcoal. The reactor used for conversion is ideally run at a low temperature, e.g., 300-450° C. Thus, there is negligible cracking. The reactor can also be run at higher temperatures to increase yields of pyrolysis gases and oils. The biomass can also include algae, bacteria and other organisms that produce organic matter. The product is primarily a solid carbon product, which is safe and can be easily handled. The carbon product can also be safely stored. In one embodiment, the carbon product is buried in a location that has been tested for limited oxygen at burial depths, or has been covered to assure limited oxygen exposure. The burial and/or coverage is such to provide an anoxic location for the stored carbon product. The permanence of the $CO_2$ reduction is therefore assured.

DETAILED DESCRIPTION

Figure 1:
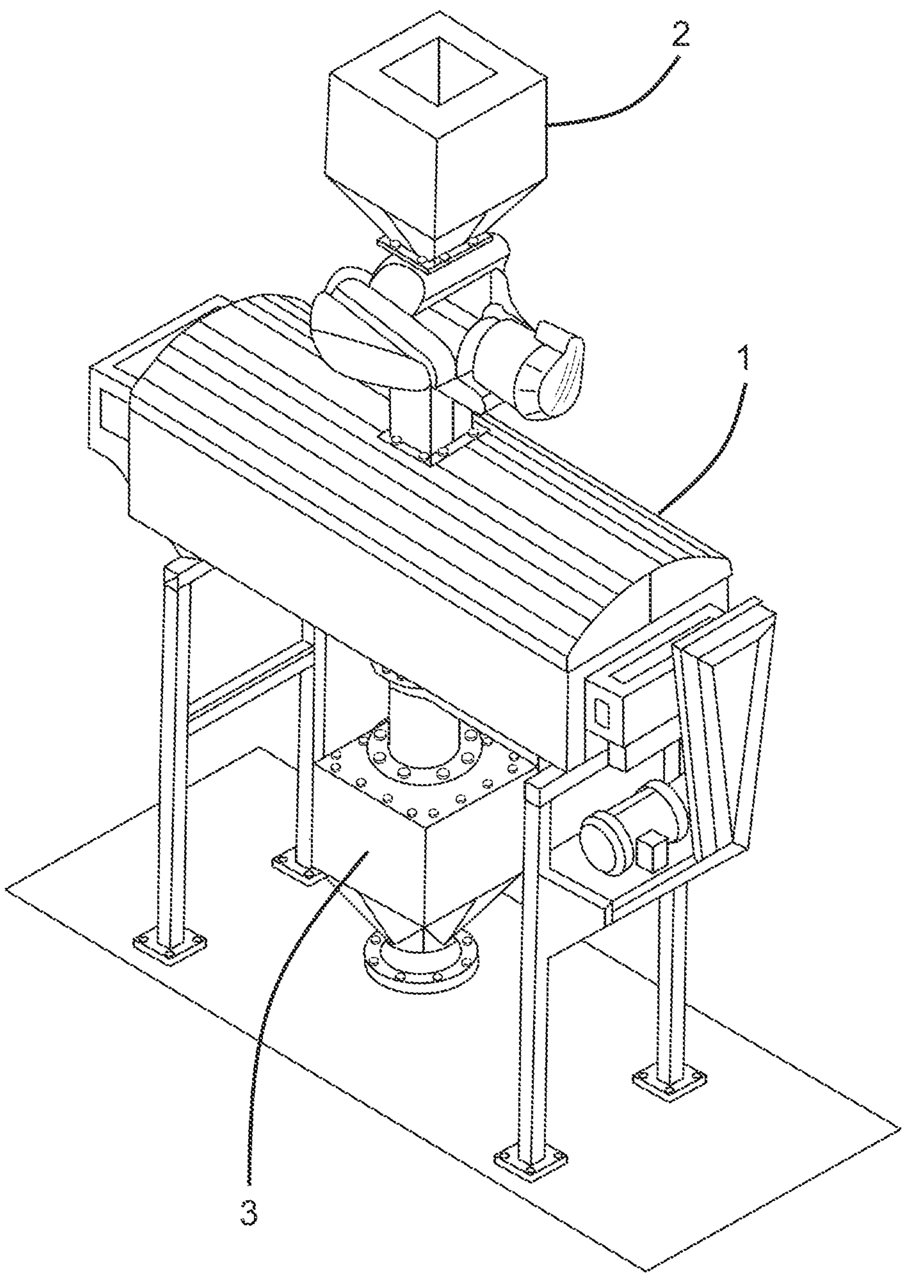
FIG. 1 depicts a reactor of one embodiment of the present application.

Definitions for carbon capture and storage for climate change mitigation:

Direct Air Capture (DAC): the removal of $CO_2$(g) from the atmosphere at concentrations below 1000 ppm using non-natural physical and chemical processes.

Biomass: solid or liquid material resulting from plants and created by the photosynthesis process.

Carbon: (i) an atom with 6 protons, and (ii) a generic term to refer to any material containing carbon atoms for the purpose of reducing carbon dioxide in the atmosphere.

Pyrolysis: the breaking apart of chemical bonds with heat.

Torrefaction: the process of generating solid residue by heating a solid material.

Charcoal: porous material residue created by pyrolysis of plant material for the purpose of upgrading soil.

Torrefied Carbon: stable carbon-rich residue generated by the process of Torrefaction for carbon sequestration.

Provided is a process for preparing torrefied carbon while bypassing the entropy penalty of carbon removal from the atmosphere. The energy and cost associated with accumulation of $CO_2$ from low concentration air is a thermodynamic penalty that cannot be eliminated, but it can be bypassed by utilizing alternative process methods. Direct air capture concentrates carbon dioxide from the air at ~400 ppm with a thermodynamic minimum energy input of 20 kJ/mol. Real-world implementation of DAC requires almost 20 fold more energy than the minimum required amount due to thermodynamic inefficiencies.

Instead of using mechano-chemical equipment to concentrate and react $CO_2$ from air, the starting point for a carbon storage technology can be biomass or plant materials including trees, grasses, urban yard waste, agricultural residues, food waste, and many more reduced carbon sources. These carbonaceous resources can be obtained distributed throughout urban and rural locations at negative and positive prices, depending on the quality of the material, providing gigatonnes of reduced carbon for sequestration.

The direct-air capture methods of adsorption, absorption, and membrane separation that exhibit substantial entropy penalties in equipment and operating costs associated with accumulating $CO_2$ from the air are compared with the present methods of utilizing biomass and bypassing the entropy penalties. The photosynthetic process uses sunlight to drive the conversion of atmospheric $CO_2$ to biopolymers including cellulose, creating solid partially-reduced carbon at the Gigatonne scale. Plants and trees pay the 'entropy penalty' using free solar energy, and they self-replicate and grow to operate independent of human interaction or input. By the present process carbohydrates and bio-derived biopolymers can then be converted through the process of torrefaction to a solid carbon that can be stored for thousands or millions of years. Through a technoeconomic analysis of a new biomass torrefaction technology, this process is identified to have lower capital and operating costs, providing a feasible method for Gigatonne-scale capture and storage of atmospheric carbon.

Bio-derived carbon provides substantial economic and energetic advantages compared to direct air capture by photosynthesis. In addition to using solar energy to accumulate and concentrate $CO_2$, biomass carbon is partially reduced by photosynthetic biochemistry. By photosynthesis, plants accumulate atmospheric $CO_2$ and reduce it with solar energy input into carbohydrates and other biopolymers; carbon in the form of $CO_2$ in the atmosphere is reduced from +4 to 0 oxidation state when plants synthesize carbohydrates such as glucose as the monomer of cellulose. The photosynthetic reaction of carbon dioxide and water requires 479.1 kJ/mol to produce 02 and carbohydrate repeat units ($CH_2O$). All of this energy is expended without human intervention. Subsequent torrefaction produces a carbon-rich solid material. If the solid is assumed to be pure graphite, then the process requires only a small energy input (66 kJ/mol-C). However, real torrefied carbons are generated within reactors with a more complicated final structure alongside gases and vapors, and the entire torrefaction process is exothermic. In summary, the DAC process followed by reduction to methanol requires almost an order of magnitude more energy input than photosynthesis and torrefaction when accounting only for the thermodynamics of chemical change.

The present torrefaction process aims to make stable carbonaceous materials that can be buried, leading to long-term storage of carbon underground in a form that can last thousands to millions of years. Natural woody biomass material primarily consists of carbohydrates bound up into a composite called 'lignocellulose' that includes the branched lignin polymer integrated with hemicellulose and cellulose. These natural materials decompose with time via biological mechanisms producing carbon monoxide, carbon dioxide, methane and other volatile organic compounds (VOCs) that are greenhouse gases. With these emissions, forests and other regions with substantial vegetation contribute to a natural continuous cycle of photosynthetic temporary carbon sequestration followed by emissions of gases and vapors, with a slow net accumulation of carbon.

Breaking the cycle of carbon uptake and release from regions of natural vegetation can occur by synthetically converting biomass to a stable form prior to degradation. The most carbon-efficient process for converting biomass to a stable solid form is low-temperature pyrolysis (referred to as torrefaction); lower temperatures minimize cracking reactions that release volatile organic compounds (VOCs) and reduce solid yields. During torrefaction, biomass loses oxygen and hydrogen, producing a carbon-rich solid product with increased heating value. The torrefied material decreases in moisture and takes on a more hydrophobic microstructure, with a compositional change eliminating the fibrous nature of biomass for a more grindable char. The lignocellulosic material transforms from a white-brown-grey virgin material to a dark-grey/black char, with concomitant increase in the degree of carbon-carbon bond unsaturation and aromaticity. These physical and chemical changes to biomass significantly reduce the capability of fungi and bacteria to degrade biomass to volatile products, yielding a stable solid that can sequester carbon long term.

Torrefaction of biomass occurs within a heated reactor chamber generally devoid of molecular oxygen in less than an hour of total reaction time. The control of heat transfer into the biomass is a critical characteristic of reactor design, as the temperature of reacting biomass determines the yield of solid carbon product. Initial heating primarily evaporates water at lower temperatures in the absence of biopolymer degradation; after the drying phase biomass particles further heat until the onset of biopolymer thermolysis. A critical transition temperature of thermally-decomposing cellulose has been identified as 467° C.; above that temperature cellulose rapidly fractures and depolymerizes to volatile products, while lower temperatures lead to faster dehydration rates and higher solid yields. To maximize total productivity of solid char product, torrefaction reactors are designed with many geometries and mechanisms of biomass flow to rapidly heat biomass particles to temperatures below 450° C.

The entire torrefaction process sequence considered herein converts biomass into torrefied carbon buried underground. Biomass is transported to the site of the torrefaction reactor, after which it is loaded into the reactor hopper. Once inside the reactor, the particle is heated via an external heat source leading to initial evaporation of water followed by decomposition and dehydration of the internal biopolymers, producing solid torrefied carbon product. During reaction, emitted vapors exiting the reactor can be redirected to an oxidizer that generates heat transferred into the reactor through the reactor wall. Torrefied carbon exits through a lock hopper to allow the solid to cool, after which it is transported to a burial site and deposited underground. Each step of this sequence contributes to the accumulated benefit for removing carbon dioxide from the atmosphere and reduction of the associated cost.

While any such appropriate reactor to affect the desired pyrolysis can be used, a particular example of a preferred reactor is provided herewith. This example is not intended to be limiting. Thus, in one embodiment, the process for converting biomass to a solid carbon product for burial comprises passing the biomass waste into a reactor comprising a twin screw conveyor. The biomass waste is passed along the length of the reactor with heating and mixing. The reactor is heated to a temperature low enough to avoid cracking of the hydrocarbons in the biomass waste, e.g., 300-450° C., 350-450° C., or more preferably 350-400° C. The twin screw conveyor provides the mixing and conveyance along the length of the reactor. A solid carbon product is then collected from the reactor. In another embodiment the reactor is heated between 300-100° C., e.g., 450-1000° C. Higher temperatures promote cracking reactions that lead to higher yields of $H_2$, light gases and oils.

The reactor employs a twin screw conveyor to keep the biomass mixed thoroughly while heating, to maintain a uniform temperature profile and faster heat transfer. FIG. 1 depicts one embodiment of such a reactor 1. The hopper 2 is for adding the biomass, which allows control of the addition. The exit lock hopper 3 allows the solid to cool prior to handling of the charcoal.

The process is semi-batch, meaning a certain amount of material enters the reaction vessel and then reacts/heats for a certain amount of time (1-60 min.), and then exits; subsequently another batch of fresh biomass enters the reaction vessel, and the process is repeated. The mixing action of the screws aids significantly in improving the heat transfer. The reactor is heated from the bottom with one or more burners that combust the gases created during heating of the biomass. This allows the process to be self-heating, without any energy inputs for heating (although electricity is required for the motors to spin the screws). The burner design allows for switching from biomass gases to other gases as needed.

The entire vessel can be sealed from the outside air and nitrogen purged. The sealing is completed 2 with two types of airlocks, a rotary valve, and a butterfly valve, although a rotary valve may be used on both sides 2 and 3 if desired. This can improve nitrogen retention.

Figure 2:
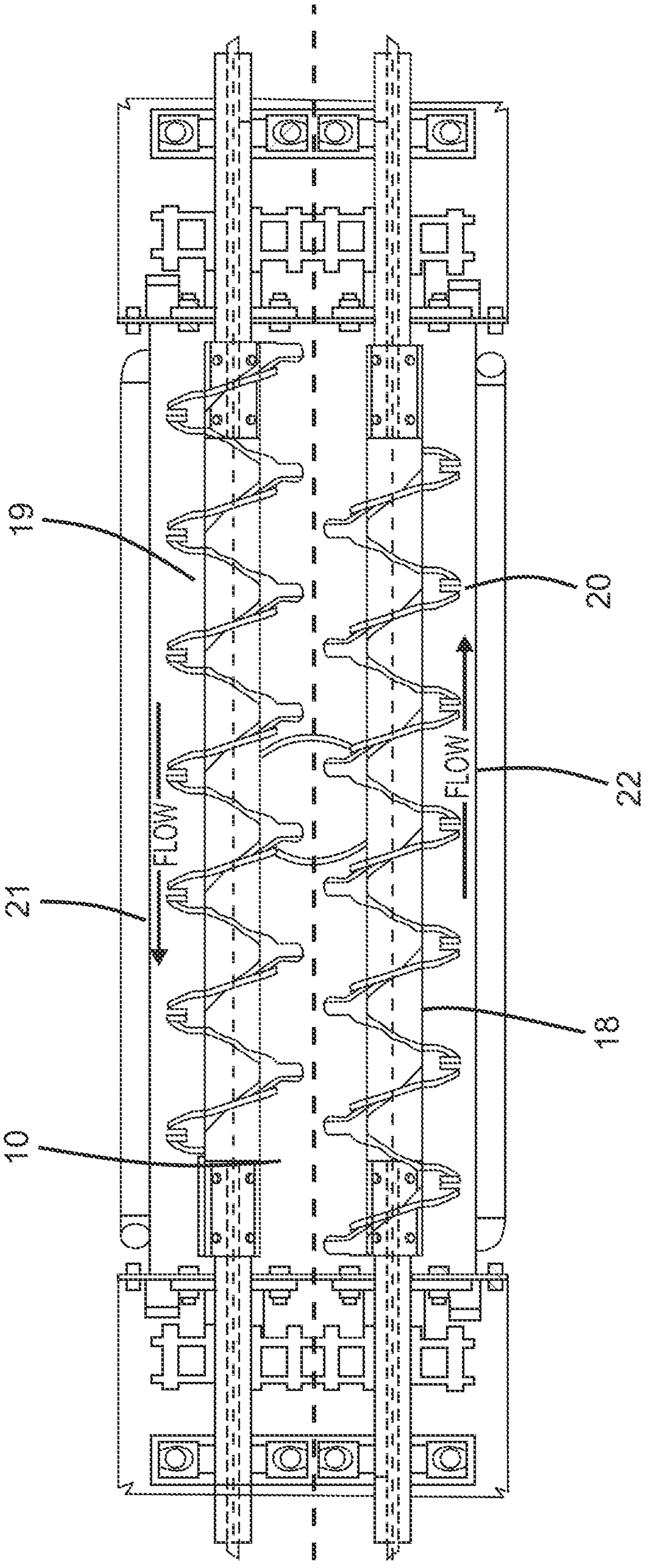
FIG. 2 schematically depicts the screw conveyers of the reactor.

In this embodiment, the reactor is a twin mixing screw conveyor. It is designated primarily for batch-process heating and mixing of biomass. The reactor, for example, can comprise a twin 7' ID×4'-0" long trough 10 that encapsulates two 6" diameter augers 18 and 19, with right hand cut and folded flighting 20. The augers are designed to convey material in a circular motion (see flow arrows 21 and 22) 360 degrees around the central discharge port as seen below in FIG. 2.

Figure 3:
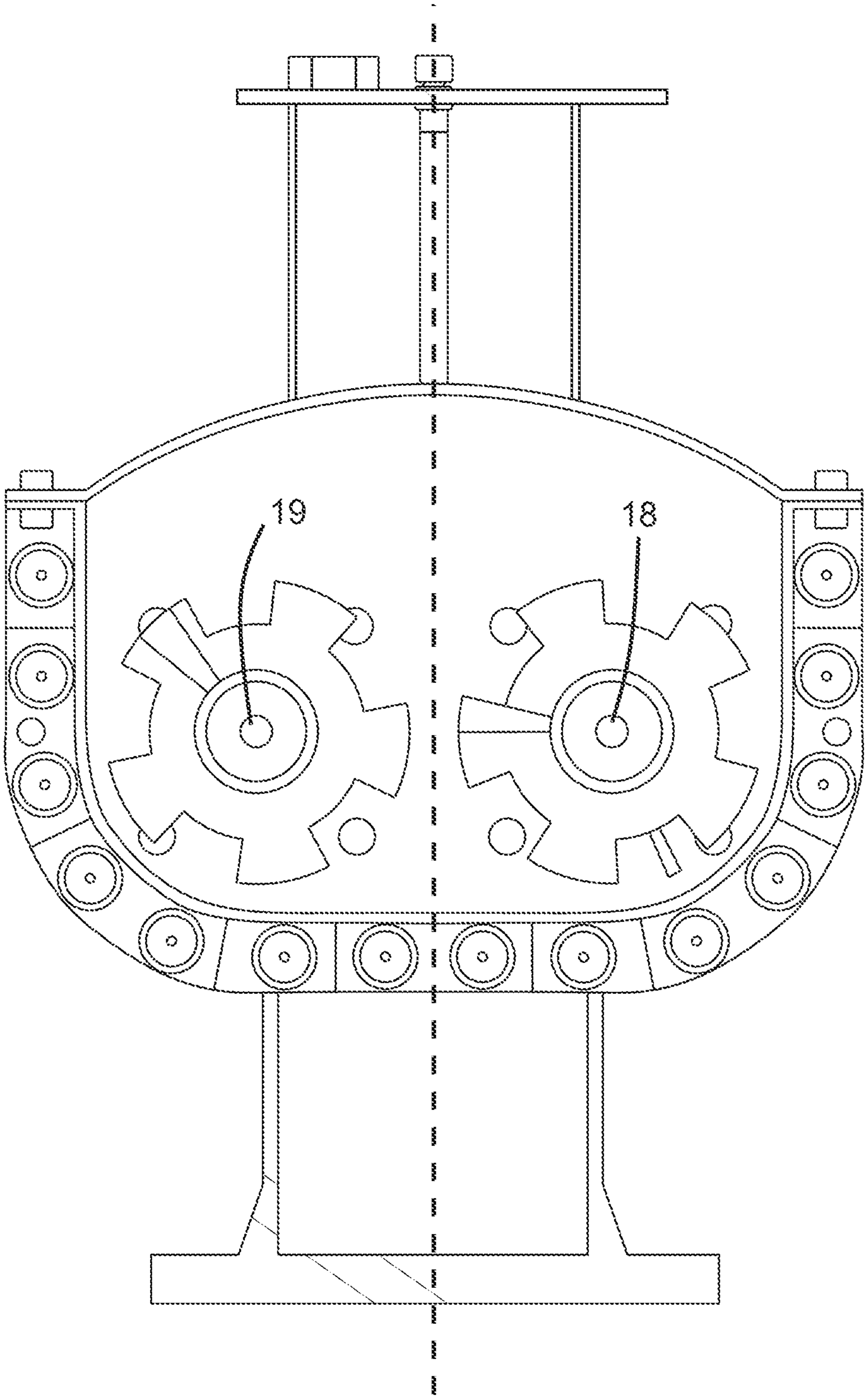
FIG. 3 schematically depicts the screw conveyers from an end view to better show the cut and folded flights of the screw conveyers.
Figure 4:
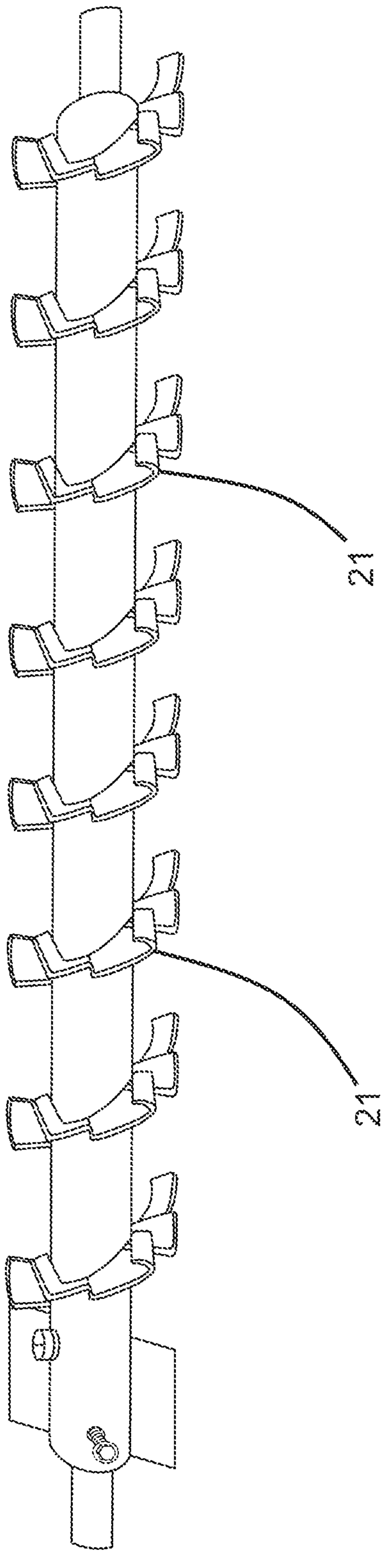
FIG. 4 depicts one embodiment of a screw conveyer.

In addition to circulating material in the indicated direction, the cut and folded flights further circulate material, while it conveys, in a 360 degree motion around the central pipe of each auger 18 and 19 (see FIG. 3). As shown in FIG. 4, the "folded" parts 21 of the flights act as mixing "fingers" that lift the material as it conveys from 6 o'clock on the flight face to roughly 2 o'clock. This prevents material from conveying en-mass and exposes more material to the bottom of the trough, which promotes heat transfer and quicker reactions times. This enhances greatly the efficiency and effectiveness of the torrefaction of the biomass material.

Figure 5:
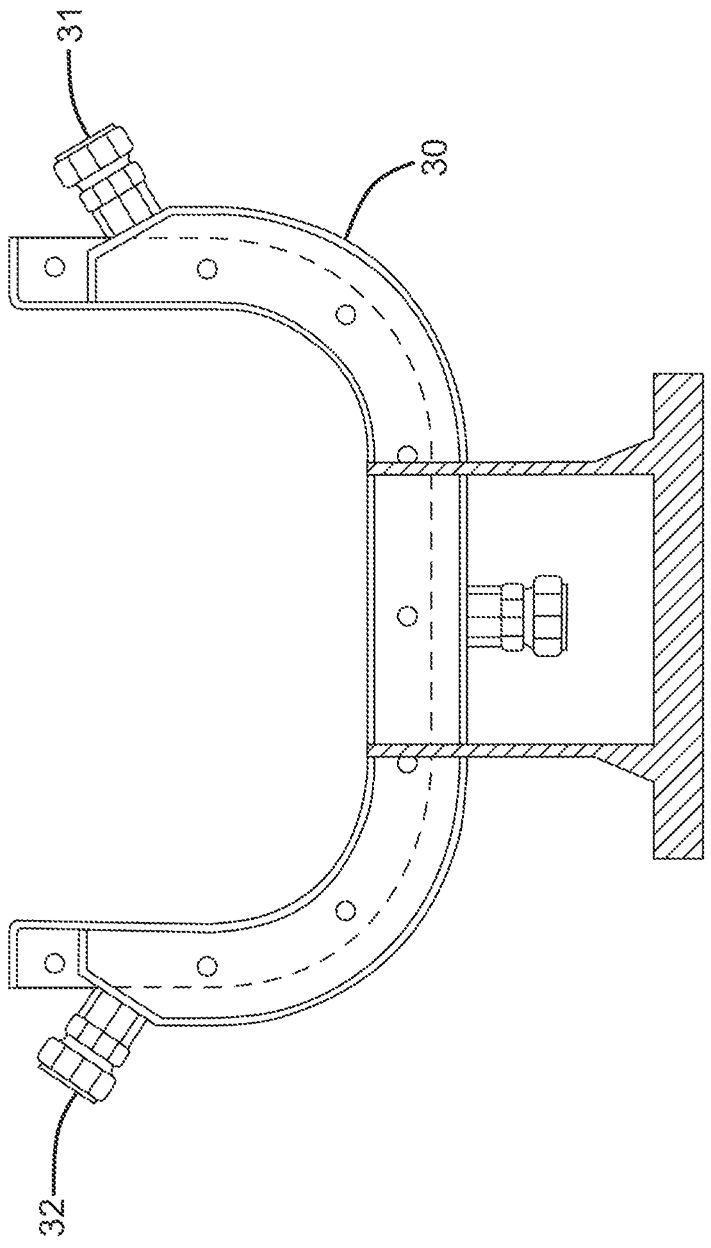
FIG. 5 schematically depicts in one embodiment, a containment around the reactor for heat transfer fluid such as molten salt heat transfer fluid.

In one embodiment, as shown in FIG. 5, a secondary volume 30 around the reaction vessel is added to include a heat transfer fluid. This fluid provides two functions, first to improve the heat transfer by allowing convective flows of fluid around the outside of the reactor, and second to provide an energy storage medium that will buffer the transients in heat provided by the burner as the combustion gases from the reaction change over time during the reaction. In one embodiment, a blend of 60% $NaNO_3$ and 40% $KNO_3$ (by mass), commonly referred to as solar salt is used as the heat transfer fluid. This molten salt has the advantage of lower corrosiveness (compared with chlorides), its relatively low melting point of 220° C., and its decent heat storage ability (heat capacity). In effect, the system has a thermal battery around the reactor that limits temperature swings. FIG. 5 depicts the containment 30 around the reactor for a heat transfer fluid, such as a molten salt heat transfer fluid. Addition of the heat transfer fluid can be made at ports 31 and 32.

In another embodiment, the fluid can be pumped around the reactor and through the screws to increase heat transfer. The twin screws can be designed for this.

In another embodiment, the heat capacity of the entire system is improved by using a solid metal rod for the screws and relatively thick stainless steel on the body. The entire reactor is then insulated from the atmosphere with thick mineral wool. Thermal breaks are provided between the reactor and valves in the form of a long cylinder that allows material to pass through, but are thin walled to limit heat transfer (some portion of these are insulated). This also buffers transients. The reactor operates between 300-450° C., but ideally 350-400° C. This reactor provides improved heat transfer, reliability, efficiency and economics.

Monitoring of the reaction can be used to insure a complete and efficient reaction.

To determine the net carbon dioxide offset by this process and the associated offset economics, the entire sequence was considered via a Monte Carlo model that considers variations in sources of mass, energy, and cost. As described in Table 1 below, a mass and energy balance of the torrefaction reactor processing 60 tonnes of biomass per day with input variables exhibiting Gaussian distributions based on both piloted experimental reactor performance (see supporting information for details of each input variable) and other parameters described in prior literature. Reactor inputs include reactor power requirements (kWhr tonne$^{-1}$), biomass moisture content (wt %), reactor carbon yield of torrefied product (C %), vapor and gas yield (wt %), energy requirements to transport biomass to the reactor (gallons diesel per tonne biomass), energy required for preprocessing biomass (gallons diesel per tonne biomass), post-processing of torrefied carbon (gallons diesel per tonne biomass), and torrefied carbon transport and burial (gallons diesel per tonne biomass).

TABLE 1

Monte Carlo Torrefaction Model Input Parameters. Each input describing the balance of mass and energy and the overall process economics in 2022 U.S. dollars was described via a Gaussian distribution with mean and standard deviation. Randomly selected input parameters with a negative value were assigned zero. A description of all process input parameters is provided in the supporting information.

| Input Parameters | Mean | St. Dev. |
|---|---|---|
| Mass and Energy Model † | | |
| Biomass collection (gal diesel tonne-biomass$^{-1}$) | 1.0 | 0.5 |
| Biomass chipping (gal diesel tonne-biomass$^{-1}$) | 2.17 | 0.58 |
| Biomass transportation (miles tonne-biomass$^{-1}$) | 55.0 | 22.5 |
| Biomass moisture (wt %) | 25 | 7.5 |
| Biomass carbon content (wt %) | 53 | 4 |
| Power requirements (kWh tonne-biomass$^{-1}$) | 40 | 12 |
| Reactor carbon yield (C %) | 80 | 5 |
| Torr. carbon transportation (miles tonne-biomass$^{-1}$) | 30 | 15 |
| Effluent vapor LHV (GJ tonne-biomass$^{-1}$)* | 21 | 1 |
| Torr. carbon burial (gal diesel tonne-biomass$^{-1}$) | 0.28 | 0.14 |
| Economic Model † | | |
| Biomass cost ($ tonne-biomass$^{-1}$) | 34 | 13 |
| Reactor capital cost ($) | 675000 | 162500 |
| Reactor lifetime (years) | 6.5 | 1.75 |
| Electricity usage (kWh tonne-biomass$^{-1}$) | 40 | 12 |
| Electricity rate ($ kWh$^{-1}$) | 0.07 | 0.02 |
| On-site diesel (gal diesel tonne-biomass$^{-1}$) | 3.44 | 1.22 |
| Diesel rate ($ gal-diesel$^{-1}$) | 5.75 | 0.875 |
| Propane usage (kg tonne-biomass$^{-1}$) | 2.75 | 5.09 |
| Propane rate ($ kg$^{-1}$) | 0.9 | 0.22 |
| Nitrogen usage (m3 tonne-biomass$^{-1}$) | 5.66 | 1.42 |
| Labor (hours day$^{-1}$) | 12 | 2 |
| Labor rate ($ hour$^{-1}$) | 25 | 2.5 |
| Supporting equipment ($ tonne-biomass$^{-1}$) | 4.50 | 0.75 |
| Trucking distance (miles tonne-biomass$^{-1}$)† | 85 | 37.5 |
| Land cost ($ tonne-biomass$^{-1}$) | 5.56 | 2.78 |
| Burial cost ($ tonne-biomass$^{-1}$) | 6 | 3 |
| Onsite trailer ($ tonne-biomass$^{-1}$) | 0.15 | 0.07 |
| Site management ($ tonne-biomass$^{-1}$) | 0.73 | 0.12 |
| Overhead ($ tonne-biomass$^{-1}$) | 0.81 | 0.18 |

*LHV = Lower Heating Value
†Includes delivery of biomass and transportation of torrefied carbon
‡ Descriptions of all model inputs provided in the supporting information The catalytic oxidation of VOCs provides enough heat to the reactor in most considered scenarios, such that the reaction can be considered autothermal. In select cases, for example at very high moisture contents, a small amount of propane is co-fed to provide additional heat and has been included in the model. Large trucks, earth movers, and chipping equipment are traditionally diesel powered, and estimates on their fuel usage have been included here for worst-case estimates on energy, cost, and $CO_2$ emissions. Increased efficiencies are expected through the electrification of these processes.

The moisture of incoming biomass varies greatly from <10% in the case of pistachio shells from Fresno, CA, to >40% in fresh green wood in Minneapolis, MN. Moisture can detrimentally affect reactor performance by increasing the thermal load and decreasing carbon yields. Pre-drying steps often involve the heavy use of fossil fuels and may be purposely avoided (drying will occur inside the reactor). Depending on the climate, biomass can be dried outside with sufficient time, but this process requires active management of the biomass and large storage capacities. An average moisture content of 25% with a standard deviation of 7.5% was chosen for the model to account for the majority of considered biomass feedstocks. The carbon content of incoming biomass was modeled as varying from 45 to 61 C %.

Using the mass and energy model, a Monte Carlo economic prediction of the cost per tonne of $CO_2$ equivalent offset was determined from a second set of input economic variables exhibiting Gaussian distributions described in Table 1. The economic model accounts for costs associated with diverse aspects of the process including: cost of electricity ($ kWh$^{-1}$), cost of biomass feedstock ($ tonne$^{-1}$), cost of diesel ($ gallon$^{-1}$), cost of reactor capital ($ reactor$^{-1}$), reactor lifetime (years), labor cost ($ yr$^{-1}$), supporting equipment rental ($ yr$^{-1}$), biomass transport costs ($ tonne$^{-1}$), and land and carbon storage costs ($ tonne$^{-1}$). This model assumes a linear depreciation of capital over the reactor lifetime. Details of all model parameters and justification of the proposed distribution of possible values are provided in the supporting information.

Biomass cost was estimated as a distribution at an average of $34 per tonne ($\sigma$=$13). This cost is comparable to the $40 per dry-Tonne estimation from the US Billion Ton Study Update for waste availability below 243 million dry tons when accounting for moisture content. A large amount of lower-value waste is available, although it is considerably less localized and would pose challenges for larger facilities that require larger quantities of waste (e.g., biofuels and power stations). The benefit of the selected 60 tonne/day mobile torrefaction reactor is that the smaller waste feedstock requirements allow for a more decentralized capture of biomass at potentially lower price and higher availability.

The present process focuses on the torrefaction of waste biomass products, but biomass could also be grown specifically for the purpose of carbon capture. This may be especially important in the future once existing biomass waste has already been valorized and becomes scarce or cost-prohibitive to collect. In this scenario, energy crops such as switchgrass could be grown and delivered at an estimated price of $33-$55 per dry-Tonne for facilities less than 100,000 dry-Tonnes per year. At these prices, which include transportation, the net cost of carbon dioxide removal is expected to be similar or lower than the results here. In this alternative energy crop scenario, the additional land use and farming inputs, may lead to much larger carbon dioxide release; complete analysis of the energy crop alternative scenario is beyond the scope of this work which is focused only on biomass waste.

The 60 tonne/day reactor and ancillary equipment (e.g., hoppers and conveyors) have an average total capital cost of $675 k based on existing pilot facility design (not disclosed). The distribution of reactor lifetimes is estimated with a mean of 6.5 years ($\sigma$=1.75 years), after which a significant rebuild would be required. With a linear depreciation model, this leads to an average capital cost of $4.81 per tonne of biomass. Larger reactors greater than 60 tonne/day benefit from economies of scale due to large volume to surface area that reduce metal costs. However, increased volumes tend to decrease heat transfer and can lead to longer residence times, negating much of the decrease in cost. In the case of biomass conversion, smaller reactors such as the 60 tonne per day reactor are also advantageous because of increased heat transfer, modularity/flexibility, and lower biomass requirements that minimize biomass transportation distances. The appropriate reactor size will depend on the specific site location and available biomass proximity.

With the selection of process input parameters and assigned Gaussian distributions for each parameter, a Monte Carlo simulation was conducted to determine 10,000 scenarios with randomly selected conditions weighted by each parameter's distribution. The reactor mass and energy balance model accounted for mass lost due biomass moisture content as well as the associated energy requirements to evaporate the moisture. Subsequent yield of carbon was selected from the distribution of reactor performance for each scenario, which was determined based on the literature examples of torrefaction reactor performance. Other energy inputs and emissions associated with all of the other components of the process as listed in Table 1 were also accounted for the impact on $CO_2$ emission, ultimately determining a total net amount of $CO_2$ equivalent per tonne of processed biomass.

Figure 6A:
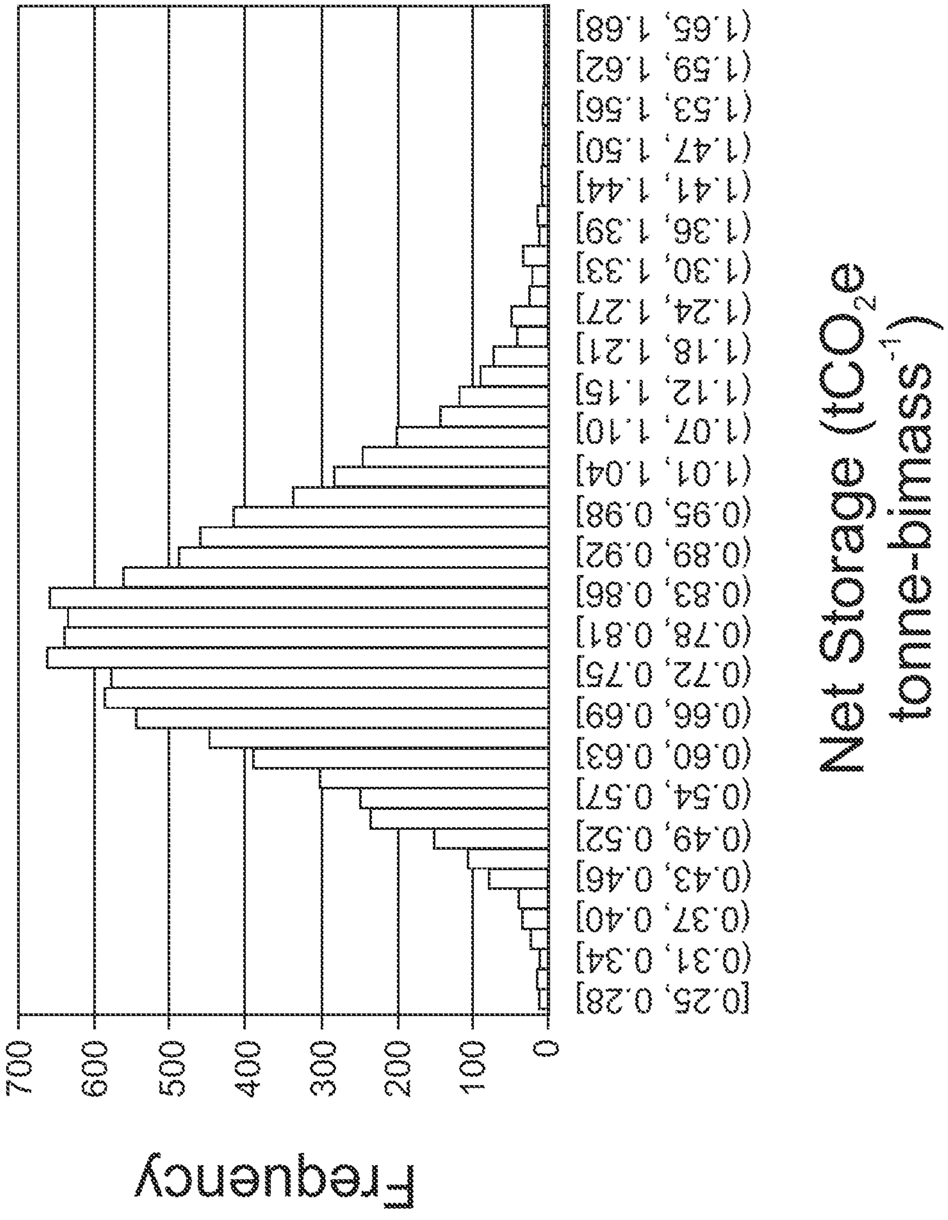
FIG. 6A shows a Monte Carlo Model Prediction net storage assumptions.
Figure 7:
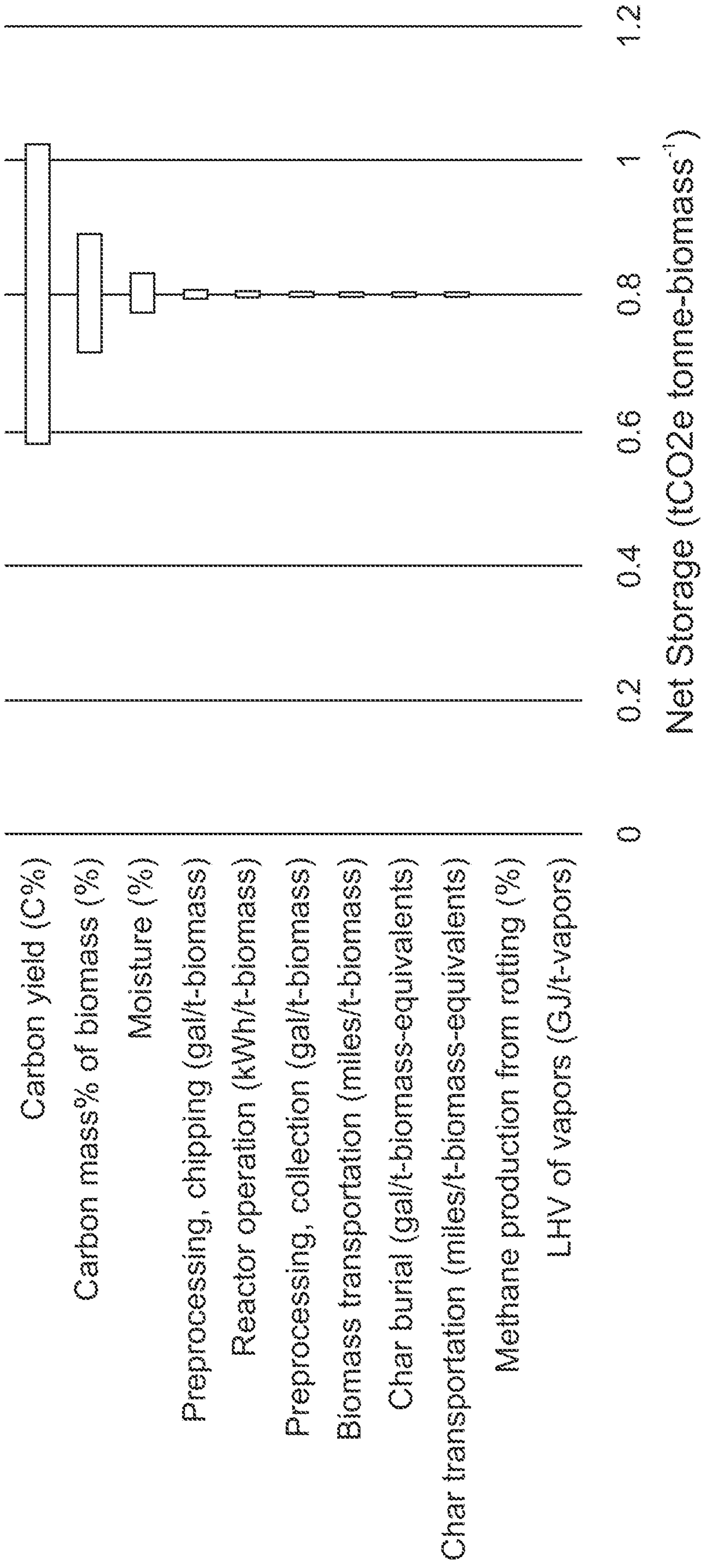
FIG. 7 shows sensitivity of biomass torrefaction net storage to input parameters varying +/−10%.

As depicted in FIG. 6A, there exists an approximately Gaussian distribution of model output scenarios leading to varying amounts of stored $CO_2$ equivalents per tonne of processed biomass ($tCO_2e$ tonne-biomass-1). The mean of the distribution is 0.81 $tCO_2e$ tonne-biomass$^{-1}$ ($\sigma$=0.18) and ranges from 0.22 to 1.60 $tCO_2e$ tonne-biomass$^{-1}$. Scenarios with the lowest carbon capture are predominantly the result of low reactor carbon yields, low starting biomass carbon fractions, and high biomass feedstock moisture content. Analogously, high carbon capture rates are observed when reactor carbon yields are high, biomass carbon content is high, and biomass moisture is low. FIG. 7 shows the effect of a +/−10% change in the mean input variable on the overall net storage of carbon dioxide equivalents per tonne of wet biomass. The reactor performance, specifically the carbon yield, has the single largest effect on net storage, followed by biomass carbon content and to a lesser extent biomass moisture content. The predominant influence of reactor carbon yield suggests that reaction conditions and reactor design play a large role in the capture efficiency of biomass torrefaction and burial (BTB).

The net storage of $CO_2$ is calculated from the produced torrefied carbon after subtracting out the $CO_2$ emissions from electrical generation, diesel usage from transportation and processing, and the $CO_2$ produced from the combustion of pyrolysis vapors. The net emission of $CO_2e$ during the process was on average 0.36 $tCO_2e$ tonne-biomass$^{-1}$ ($\sigma$=0.07). The largest portion of emissions was due to the combustion of torrefaction vapors and averaged 0.29 $tCO_2e$ tonne-biomass' ($\sigma$=0.08). These vapors are advantageous, because they provide the energy necessary to heat the biomass and drive off water. However, in most scenarios, the reaction generated an excess amount of heat energy. Torrefaction of biomass produces syngas ($H_2$ and CO), small hydrocarbons (methane, ethylene, propylene, etc.), $CO_2$, and large amounts of water. Higher reaction temperatures produce larger amounts of vapors and thus decrease carbon yields. The interplay between reaction conditions, vapor production, and yield lead to a complex distribution of possible scenarios.

Burial of torrefied carbon also leads to $CO_2$ emissions in the form of diesel combustion from transportation and digging, as well as emissions from the churning of soil. These emissions can be limited by locating reactor sites near or at burial sites and by selecting appropriate burial sites. In many cases, existing holes from abandoned mines, aggregate pits, or landfills can be used with possible co-benefits. Abandoned mines are often left without reclamation and can cause environmental problems. Torrefied carbon is a porous adsorbent that has the potential to adsorb environmental contaminants while buried in a mine. Similarly, landfills produce leachate containing toxins including per-fluoralkyl 'forever' chemicals (PFAS), heavy metals, and hydrocarbons. Many governments require daily cover of landfills with in-fill, which could be replaced with torrefied carbon with the added adsorption benefit. In the worst case of needing to dig holes for burial, it is estimated that a hole of two hectares that is three meters deep could store at least 9,000 tonnes of torrefied carbon (33,000 $tCO_2e$) without densification. Highly disturbed soil is estimated to lose about 20±2.5 Mg C ha$^{-1}$ at large depths. Thus, the disturbance of soil due to burial with digging contributes up to an additional 40 Mg C (147 $tCO_2e$), or <2% of the net carbon storage. If burial via digging a hole is required due to lack of alternative sites, it is unlikely to appreciably change the model-derived conclusions.

Figure 6B:
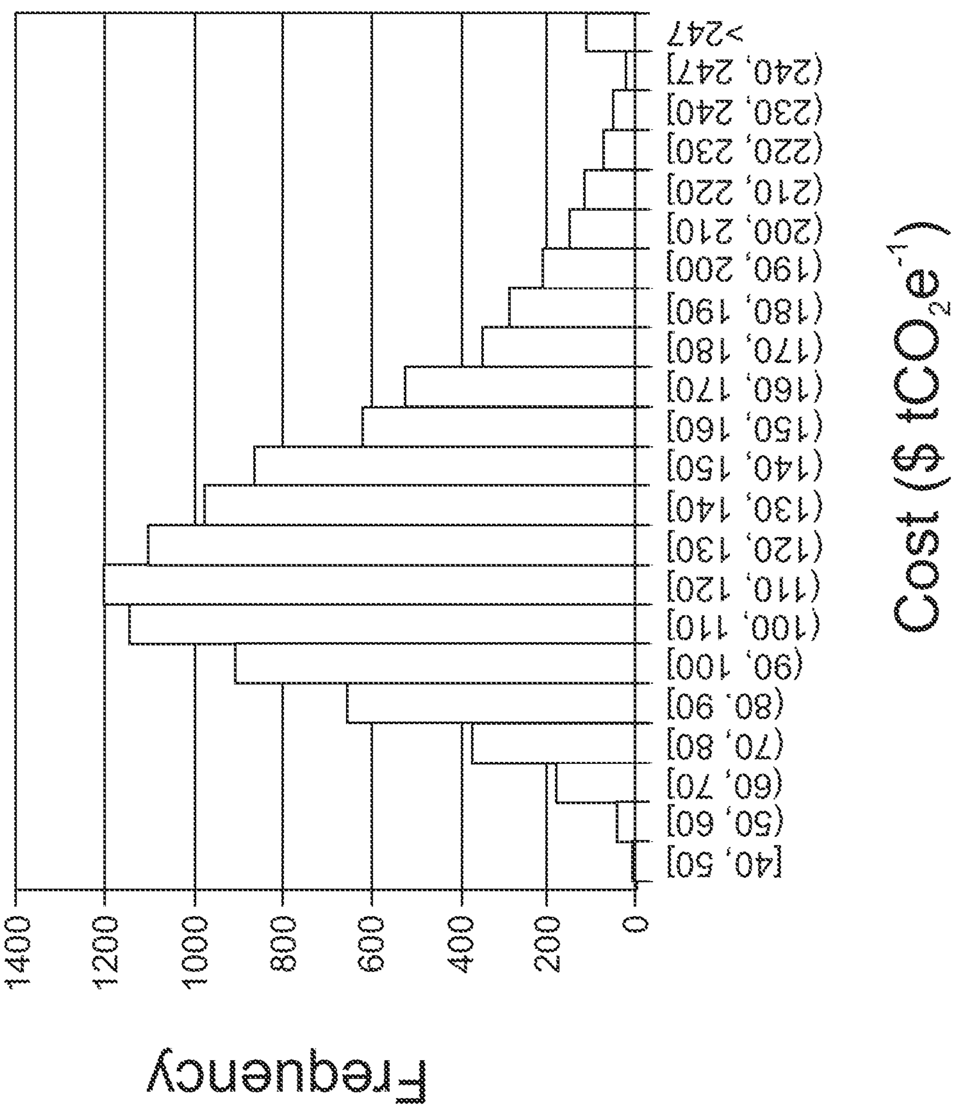
FIG. 6B shows a Monte Carlo Model Prediction of reactor yielded performance based on cost of carbon storage.

The Monte Carlo simulation also evaluated the economics of creating and burying torrefied carbon by the process described with performance and economic input parameters of Table 1. The resulting distribution of economic scenarios depicted in FIG. 6B indicates a mean cost of generating and burying a tonne of $CO_2$ equivalent at a mean of $132 ($\sigma$=41). Moreover, more than 94% of all scenarios cost less than $200 $tCO_2e$−1. The distribution indicates that only 0.4% of scenarios cost in excess of $300 $tCO_2e$−1; these are associated with high costs due to high biomass costs, poor reactor yield, and high transportation costs. The distribution has a long tail, and thus the median cost of $126 $tCO_2e$−1 is a more accurate representation of cost.

The average cost of biomass torrefaction and burial ($101 tonne-biomass−1) is dominated by the average cost of biomass and delivery ($34 tonne-biomass−1), diesel ($19.9 tonne-biomass−1), trucking ($12.8 tonne-biomass−1), and burial ($11.6 tonne-biomass−1), as shown in FIG. 6. One tonne of wet biomass leads to an average of 0.81 $tCO_2e$/tonne-biomass−1 captured through burial so that costs are higher on a $tCO_2e$ basis. Higher $tCO_2e$ yields per tonne-biomass up to 1.6 $tCO_2e$/tonne-biomass−1 are possible with higher reactor carbon yields and higher-grade biomass (low moisture, high carbon). Thus, reactor yields, and biomass quality contribute up to 50% of the total cost of torrefaction and burial per $tCO_2e$.

Perhaps most surprisingly, the capital cost of the reactor only contributed moderately to the overall cost of torrefied carbon production, consistent with the low cost reactor designs considered herein for mobile, distributed torrefaction facilities. Electricity, propane, nitrogen and general business expenses (e.g., office space, overhead, insurance, and management) were also negligible.

Figure 8:
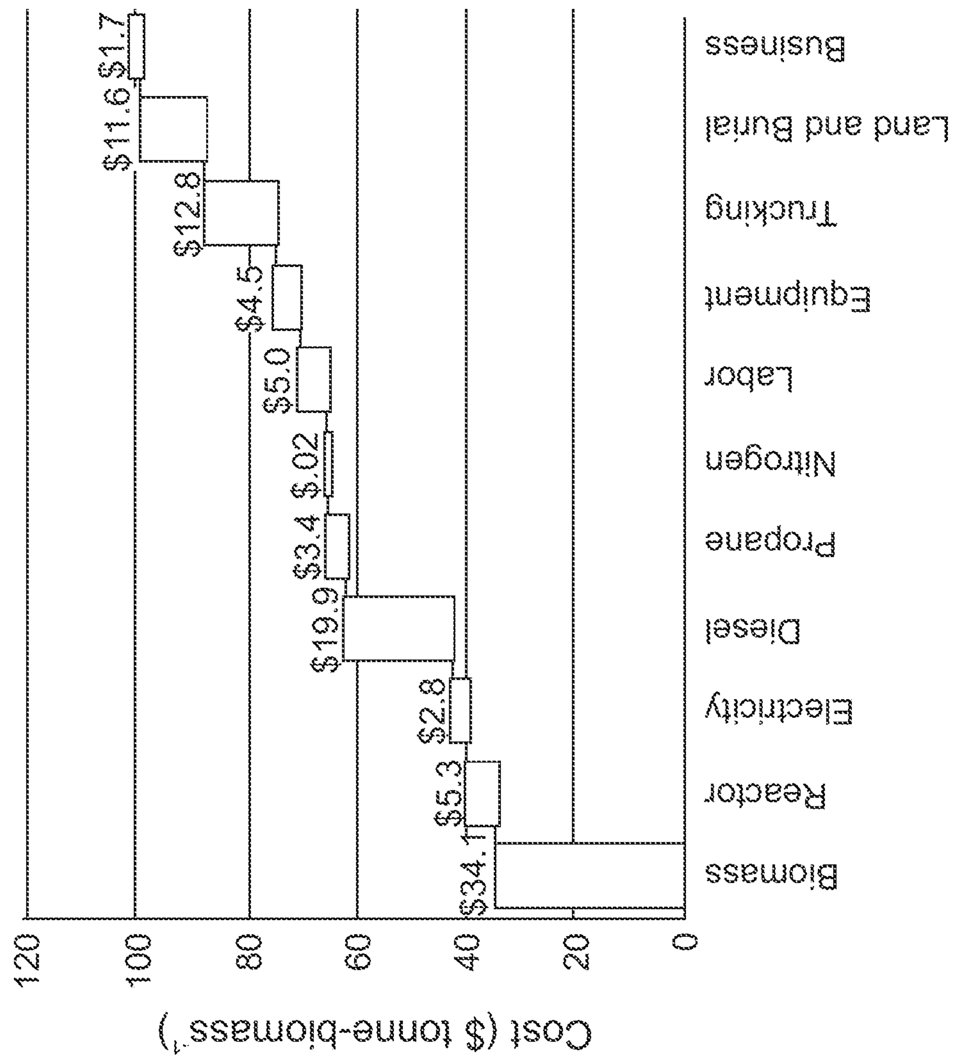
FIG. 8 graphically depicts a cost breakdown of biomass torrefaction and burial for a ton of wet biomass.

Opportunities for future cost reduction exist. The cost of biomass waste is typically dominated by the cost of collection and transportation. In certain cases, biomass waste is considered a problem and has a negative value. Small, modular, and portable reactors would have the benefit of co-locating biomass torrefaction where the waste is produced, potentially limiting transportation. Also, the reactors could be sized appropriately for waste generation in a local area and a network of decentralized reactors could treat a larger area. Similarly, reactors could be co-located at burial sites to minimize trucking of the torrefied carbon. Many variables must be considered to optimize the net $CO_2$ captured and cost per $tCO_2e$. Lastly, the electrification of heavy machinery and trucking would reduce $CO_2$ emissions, when renewable electricity is used, and potentially reduce costs. FIG. 8 graphically provides a breakdown of biomass torrefaction and burial to process a tonne of wet biomass.

One must concern themselves with the issue of torrefied carbon and its permanence. The chemistry of torrefaction converts biomass to a carbon-rich solid resistant to decomposition to gas-phase products. Carbohydrates comprise the bulk of most biomass in the form of cellulose and hemicellulose, both of which have an O/C molar ratio just below one. These carbohydrates are rapidly utilized by microbes and fungi, which produce volatile organic compounds and light gases such as $CO_2$ and methane, a potent greenhouse gas. Similarly, about a quarter of biomass is comprised of an oxygenated aromatic biopolymer called lignin, which also degrades via microbes and fungi. The rate of lignocellulose decomposition depends on the type of biomass, the exposure to moisture and air, and the general conditions (e.g., temperature, solar exposure) of the plant during the decomposition process. Hence, direct burial of lignocellulosic biomass is not a feasible approach to carbon sequestration. Once underground, biomass will continue to decompose forming $CO_2$, methane, and volatile organic compounds.

Despite the decomposition of dead plant material to greenhouse gases, it has been proposed that reforestation can serve as a net accumulation of carbon extracted from the atmosphere by photosynthesis. Young forests on formerly cultivated land exhibit substantial biomass growth accumulating carbon in lignocellulose and soils, motivating deliberate reforestation practices over natural regeneration. However, reforestation to accumulate carbon in soils requires decades, and the net accumulation of carbon, positive or negative, depends on the situation and forestation practices. Additionally, the use of new forests to sequester carbon is challenged by the needs of local agriculture, the problems of poverty, and expanding populations.

Alternatively, conversion of biomass to more stable char provides a pathway to rapid permanence of stored carbon. Torrefied carbon forms a heterogeneous porous solid that has a lower O/C ratio consistent with more unsaturated carbon-carbon bonds and higher overall aromaticity. While biomass might start with an O/C molar ratio of 0.7 to 1.0, torrefied carbon typically has an O/C ratio significantly below 0.5 even down to 0.2. Loss of hydroxyl groups during torrefaction also increases the hydrophobicity, decreasing the possibility that moisture uptake will contribute to decomposition. These properties varying moderately over many grades of carbons have led to the proposed utility of blending into soils as a beneficial additive, where it can increase carbon content of the soil while also improving nutrient accumulation and general soil fertility.

The new properties of carbons post-torrefaction also impart resistance to microbial breakdown with dramatically increased stability. Carbonaceous materials have accumulated in soils throughout time due to the formation of chars in wildfires, accumulating worldwide up to 0.2 Gt $yr^{-1}$ of atmospheric carbon dioxide. These torrefied carbons are known to exhibit stability over thousands of years, as evidenced by the archaeological discovery of carbon-rich soils resulting from the chars of the fires of ancient civilizations. This is consistent with contemporary laboratory studies, that have shown that charcoal can exist in soils for thousands of years in confined laboratory incubations. Stability of soil carbons correlates with the extent of oxygen in the biomass; low oxygen content carbons with O/C molar ratios below ~0.6 have been measured to exhibit decomposition half-lives of hundreds to millions of years.

Even higher stability of torrefied carbons occurs when the carbonaceous material is protected from the oxygen content of the atmosphere. Large volumes of carbon could be accumulated in abandoned mines, deposited in the deep ocean, or stored underground in covered pits. Buried below ground, torrefied carbon experiences reduced oxygen and moisture from the atmosphere. This is consistent with measurements of the age of carbon in soil with depth; soils deeper than 0.2 m have been measured to have carbon content as old as 2,000-10,000 years. Carbon stable for thousands of years at this depth and deeper (0.6-0.8 m) is likely to remain stable, even in the presence of oxygen or water, provided fresh solid organic material (i.e., plants) are not added to promote microbial growth. All together this indicates that torrefied carbon buried underground at an appropriate depth will be stable for tens of thousands of years or longer. The important aspect is that the location of the charcoal carbon product is an anoxic location for the stored carbon product. This can be achieved by testing the soil or location for storage before storing the carbon product and/or testing after storage to assure an anoxic environment for the torrefied carbon product.

In one embodiment, charcoal is buried, covered, and the oxygen concentrations of the location for the charcoal are measured along a profile of covered depth. The oxygen concentration is measured as the partial pressure of oxygen present in the void space (i.e., gas-phase) or as the amount of oxygen gas present in water (i.e., dissolved oxygen) when water is present. For example, the oxygen concentration at 0.2 m is measured should that be the depth of burial or the amount of cover used. In one embodiment, the charcoal is buried at a sufficient depth or enough cover is added to reduce oxygen concentrations in the location of the buried or covered charcoal to an oxygen concentration that is anoxic, i.e., it would not support aerobic microbial activity. This can generally be viewed as less than 1-2% oxygen, or for dissolved oxygen, from 1-2 mg/l.

In one embodiment, burial occurs at a depth of at least 0.2 m, but also preferably in soil tested for oxygen and moisture. By burying in soil having limited oxygen and moisture, but particularly limited oxygen, further permanence is assured. The measure of limited oxygen depends on the form of oxygen and specifically whether it is dissolved in water or adsorbed in solids but is generally defined as a concentration which cannot support aerobic microbial activity. This is generally less than 5-10% of atmospheric concentrations which comprise 21% oxygen. Therefore, the oxygen concentration generally ranges from less than 1-2%.

In one embodiment, charcoal is piled, and a cover is applied on top. The cover could be in the form of soil, clay, plastic, or another material.

In one embodiment, charcoal is mixed with a liquid to create a slurry and injected underground. The liquid could be water or another flowable liquid.

In another embodiment, the charcoal is deposited deep underground. This includes in abandoned mine shafts, oil injection wells, underwater, or another location underground. The charcoal may be covered with soil, clay, plastic, water, concrete, steel, or another material.

Burial and/or cover of charcoal imparts many benefits. In addition to reducing the available oxygen, it also protects the charcoal and aromatic moieties from sunlight and UV degradation, mechanical attrition, ozone (radical) oxidation, freeze/thaw cycling, run-off, and infiltration. Furthermore, anoxic burial prevents aerobic microbial and fungal degradation. Anaerobic degradation is negligible due to lack of nutrients that support anaerobic microbial and fungal growth. Therefore, no known degradation mechanisms exist in anoxic burial pits and durability is expected to mimic the permanence of coal underground for 300 million years.

A carbonaceous feedstock required to generate torrefied carbon is diverse in nature and distributed throughout the world at the volume required to offset global carbon emissions. Lignocellulosic material available as waste on the scale of gigatonnes already exists in the forms of landscape waste (e.g., lawn and brush clippings), agricultural waste (e.g., hulls and shells), industrial waste (e.g., paper packaging), forestry management residues (e.g., branches and wood chips), municipal solid waste (e.g., waste paper), construction and demolition waste, and food waste (e.g., rotting agricultural products). For example, the extent of agricultural waste is substantial, with most crops producing residues that accumulate and degrade or are tilled back into the soil and decompose; this includes corn stalks and cobs for maize, bagasse from sugar cane, stalks from cotton, and husks and shells from coffee, coconuts, rice, soybeans, and many types of nuts including almonds, peanuts, and walnuts. Alternatively, growth and/or harvesting of non-food energy crops extends to woody and herbaceous plants including fast-growing trees, grasses, ocean organic matter, or algae among others are deliberately grown or managed to maximize recovery of carbon fixed into plant material via photosynthesis.

Accounting for the full extent of biomass availability is complicated by the diversity of sources, geographical distribution, cost of supply, and political acceptability of using particular biomass resources. In the recent 2016 Billion Ton Study by the U.S. Department of Energy, the total quantity of biomass available per year in the United States was estimated in the range of 1.19 to 1.52 billion dry tons by the year 2040. This comprehensive study accounts for biomass available for $60 per dry ton or less available at the roadside or farm gate entrance, with the most biomass-dense regions supplying 1,000-5,000 dry tons of biomass per square mile per year. For comparison of scale, the USA produced 15.1 billion bushels of maize grain (not waste) in 2021 comprising ~0.4 billion tons of biomass. This grain has accompanying residues of leaves, stalks, and cobs (i.e., stover) comprising almost a 1:1 ratio in mass with the grain for approximately another quarter billion tons of biomass, of which only about a third is harvested. While the waste identified in this report is substantial, even more biomass could be generated if required via deliberate growth of energy crops.

Assessing the global scale of biomass supply is substantially more complex due to the differences in agriculture and geography among countries. The total amount of available biomass has been estimated in the range of 10-50 gigatonnes per year. For example, one study has estimated a global supply of biomass from forestry and agriculture at 11.9 billion tonnes of dry matter, while another study estimated global forest and agricultural residues at ~11 billion tons and energy crop biomass as high as 45 billion tons (assuming 1 ton equals 15 GJ). Even more, the yearly plant growth globally exceeds annual carbon emissions by more than fivefold at the level of ~140 gigatonnes per year. While the precise amount, type, and quality of biomass available in the world will continue to be estimated, there exists biomass available at the gigatonne scale for torrefaction and carbon storage that can contribute substantially to mitigating climate change.

Torrefaction of biomass has the straightforward impact of sequestering carbon permanently at low cost, but its impact can also be compared against the ‘do-nothing’ scenario. Regarding biomass waste, this material is frequently permitted to rot or decompose in nature or piles of agricultural/yard-waste piles. When plants and trees are burned or decay natural, they release the $CO_2$ back into the atmosphere along with methane and other hydrocarbons. Methane has a global warming potential of 28-34 times that of $CO_2$ and is the second largest contributor to climate change. Biomass methane emissions amount to 5-22% of global methane emissions (32-143 Tg CH4 year−1), contributing substantially to greenhouse gases in the atmosphere. Torrefaction of waste therefore has the additional benefit of storing carbon that would have been converted to $CO_2$ and methane.

The most significant impact derives from the expansion of small-scale distributed torrefaction reactors and BTB systems implemented around the world. In addition to carbon-free energy generation, the United Nations has identified negative carbon emissions (i.e., carbon sequestration) as a key contributor to keeping the world below a 2° C. global average temperature increase. The UN scenario achieves net zero emissions by 2090 as negative emissions (i.e., carbon sequestration) with significant increase between 2020 and 2030 and growth until 2090. Additionally, while carbon-free energy generation and negative emission technologies are a key role in getting to net zero by 2090, greenhouse gas emitting technologies are still predicted to emit about 20 Gt $CO_2e\ yr^{-1}$ by the end of the century.

While there will exist multiple negative emissions technologies in the future including DAC and carbon capture and storage (CCS), the scale of torrefaction alone implemented by the methods described here can be compared with the needs of the UN net zero scenario. The number of 60 tonne-biomass day-1 reactors required with time to achieve the targeted negative emissions increases with time to a total of about one million reactors distributed around the world by the end of the century. For comparison, there currently exist about half a million wind turbines in the world. These torrefaction reactors will be processing waste materials on the scale of ~20 gigatonnes $yr^{-1}$, which is below the estimated amount of total world supply of carbonaceous waste and far below the yearly world supply of biomass (~140 Gt-biomass $yr^{-1}$). At an approximate capital cost of about one million dollars per reactor system, a million distributed torrefaction reactors would cost about a trillion US dollars, which is comparable to a single year of cost for the U.S. Military. This shows that there exists enough biomass in the world that can be torrefied to solid carbon for permanent storage at a price that is far below the costs of world government spending in the 21st century.

Accumulating dilute carbon dioxide from the atmosphere to a concentrated form for sequestration imparts an entropy penalty on most negative emissions technologies, requiring capital investment for equipment and substantial energy to collect and process 400 ppm $CO_2$ in the Earth's atmosphere. Alternatively, these costs can be avoided by torrefaction of biomass, which utilizes energy input from photosynthesis to both accumulate and reduce carbon dioxide, providing tens of billions of tonnes of waste lignocellulosic material worldwide per year. Torrefaction of lignocellulosic biomass produces a solid carbon product that can be permanently buried underground for hundreds of thousands of years in a process called Biomass Torrefaction and Burial (BTB). To assess the energy requirements and economics, a small-scale torrefaction reactor (60 tonne-biomass day-1) was evaluated within a Monte Carlo model accounting for Gaussian distributions of key input parameters related to composition, ancillary operational inputs, and economic descriptors. By this method, 10,000 scenarios were compared to determine a range of $CO_2$ sequestration efficiencies and estimated cost per tonne of sequestered carbon dioxide equivalent. The mean carbon efficiency of BTB torrefaction reactor was 0.81 $tCO_2e$ tonne-biomass−1 with standard deviation, σ=0.18. Significant variation from this mean was only observed in BTB scenarios with low overall reactor yield and biomass feedstock with high moisture content. The Monte Carlo simulation also indicated that burying a tonne of $CO_2$ equivalent torrefied carbon cost on average $132 with a standard deviation, σ=$41. More than 94% of all BTB scenarios cost less than $200 $tCO_2e$−1, with the more expensive scenarios associated with high biomass and transportation costs combined with low torrefaction yields. At these economic conditions, there exists sufficient biomass waste such that manufacturing a million torrefaction reactors distributed around the world by 2090 will achieve the United Nations targets for net zero emissions and less than 2° C. temperature rise by the end of the century.

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise that as specifically described without actually departing from the spirit and scope of the present invention as defined by the appended claims.

What is claimed is:

1. A process of carbon storage comprising a) subjecting biomass to a pyrolysis process;

b) collecting the pyrolyzed carbon; and c) storing the pyrolyzed carbon, wherein the selected site for storing is tested for oxygen and moisture in the soil and the pyrolyzed carbon is buried or covered to achieve an anoxic environment.

2. The process of claim 1, wherein the storing comprises burying the pyrolyzed carbon underground.

3. The process of claim 2, wherein the pyrolyzed carbon is buried at a depth of at least 0.2 m.

4. The process of claim 3, wherein the pyrolyzed carbon is buried at a depth of 0.6-0.8 m.

5. The process of claim 1, wherein the pyrolyzed carbon is covered sufficiently to achieve an oxygen concentration in the pyrolyzed carbon that is less than 1% oxygen.

6. The process of claim 1, wherein the soil is tested for soil having less than 1% oxygen.

7. The process of claim 1, wherein the pyrolyzed carbon is buried at a depth sufficient to achieve an oxygen concentration that is less than 1% oxygen.

8. The process of claim 1, wherein the biomass comprises lignocellulosic materials.

9. The process of claim 1, wherein the torrefaction process comprises:

passing the biomass batchwise into a reactor comprising a twin screw conveyor;

heating the reactor at a temperature of 300-450° C. to avoid cracking of the hydrocarbons in the biomass waste;

passing the biomass waste with heating and mixing along the length of the reactor; and collecting a solid carbon product from the reactor.

10. The process of claim 9, wherein the reactor has a secondary volume of heat transfer fluid around the reaction vessel.

11. The process of claim 10, wherein the heat transfer fluid comprises a solar salt composition.

12. The process of claim 9, wherein the twin screw of the twin screw conveyor comprises cuts and folds.

13. The process of claim 9, wherein heat transfer fluid is passed internally through the twin screws of the twin screw conveyor.

14. The process of claim 9, wherein the twin screw conveyor comprises augers with a right hand cut and folded flighting.

15. The process of claim 14, wherein the folded portion of the flighting acts as fingers that lift material as it is conveyed.

16. The process of claim 15, wherein the material is conveyed from 6 o'clock on a flight face to above 2 o'clock.

* * * * *